(12) United States Patent
Haley et al.

(10) Patent No.: US 9,634,851 B2
(45) Date of Patent: Apr. 25, 2017

(54) SYSTEM, METHOD, AND COMPUTER READABLE MEDIUM FOR MEASURING NETWORK LATENCY FROM FLOW RECORDS

(75) Inventors: Ben Haley, Austin, TX (US); Cathy Fulton, Austin, TX (US); David Jordan, Austin, TX (US)

(73) Assignee: CA, Inc., New York, NY (US)

( * ) Notice: Subject to any disclaimer, the term of this patent is extended or adjusted under 35 U.S.C. 154(b) by 1992 days.

(21) Appl. No.: 12/426,632

(22) Filed: Apr. 20, 2009

(65) Prior Publication Data
US 2010/0265835 A1 Oct. 21, 2010

(51) Int. Cl.
*H04L 12/54* (2013.01)
*H04L 12/26* (2006.01)

(52) U.S. Cl.
CPC .................................. *H04L 12/26* (2013.01)

(58) Field of Classification Search
USPC ....................................................... 370/252
See application file for complete search history.

(56) References Cited

U.S. PATENT DOCUMENTS

| | | | |
|---|---|---|---|
| 6,321,264 B1 * | 11/2001 | Fletcher et al. | 709/224 |
| 7,123,616 B2 * | 10/2006 | Weissberger et al. | 370/389 |
| 2003/0039212 A1 * | 2/2003 | Lloyd et al. | 370/235 |
| 2003/0177212 A1 * | 9/2003 | Givoly et al. | 709/223 |
| 2006/0028999 A1 * | 2/2006 | Iakobashvili et al. | 370/252 |
| 2006/0239201 A1 * | 10/2006 | Metzger et al. | 370/252 |
| 2010/0036895 A1 * | 2/2010 | Boyd et al. | 707/204 |

\* cited by examiner

*Primary Examiner* — Brandon Renner
(74) *Attorney, Agent, or Firm* — Baker Botts L.L.P.

(57) ABSTRACT

The disclosure presents a system, method, and computer readable medium for computing network latencies. Network devices using flow processors create network traffic summary information in the form of flow records. A harvester may gather, process, and analyze flow records to find matching flows. Using matching flows, a harvester computes the latency, either one-way or round-trip, between two devices on the network. This information may be exported or stored on other devices on the network. The teachings of the present disclosure enable wide network coverage through the use of existing network traffic summary records. Further, the present disclosure mitigates network slowdowns associated with monitoring equipment. The present disclosure also reduces or eliminates the need for clock synchronization between devices on the network.

25 Claims, 8 Drawing Sheets

| + | Bits 0-3 | 4-7 | 8-15 | 16-18 | 19-31 |
|---|---|---|---|---|---|
| 0 | Version | Header length | Type of Service 26 (now DiffServ and ECN) | | Total Length |
| 32 | | Identification | | Flags | Fragment Offset |
| 64 | Time to Live | | Protocol 16 | | Header Checksum |
| 96 | Source Address 18 ||||||
| 128 | Destination Address 20 ||||||
| 160 | Options ||||||
| 160 or 192+ | Data 22 ||||||

SYSTEM, METHOD, AND COMPUTER READABLE MEDIUM FOR MEASURING NETWORK LATENCY FROM FLOW RECORDS

TECHNICAL FIELD

The disclosure relates to telecommunications and, more particularly, to a system, method, and computer readable medium for monitoring and calculating network latency.

BACKGROUND

Almost from the earliest days of computing, users have been attaching devices together to form networks. Several types of networks include local area networks (LANs), metropolitan area networks (MANs) and wide area networks (WANs). The Internet provides one example of a WAN, which connects millions of computers around the world.

Networks provide users with the capacity of dedicating particular computers to specific tasks and sharing resources such as printers, applications and memory among multiple machines and users. Some computers, commonly known as servers, provide functionality to other computers on a network. Communication among computers and devices on a network is typically referred to as traffic.

Of course, the networking of computers adds a level of complexity that is not present with a single machine, standing alone. A problem in one area of a network, whether with a particular computer or with the communication media that connects the various computers and devices, can cause problems for all the computers and devices that make up the network. For example a file server, a computer that provides disk resources to other machines, may prevent the other machines from accessing or storing critical data; it thus prevents machines that depend upon the disk resources from performing their tasks.

Network and MIS managers are motivated to keep business-critical applications running smoothly across the networks separating servers from end-users. They would like to be able to monitor response time behavior experienced by the users, and to clearly identify potential network, server and application bottlenecks as quickly as possible. They would also like the management/maintenance of the monitoring system to have a low man-hour cost due to the critical shortage of human expertise. It is desired that the information be consistently reliable, with alarm generation providing few false positives (else the alarms will be ignored) and few false negatives (else problems will not be noticed quickly).

A proper understanding of network performance requires several metrics including network latency. Network latency provides an understanding of network delays between devices on the network. A good solution to understanding network latency enables universal network coverage, gathering real data, and mitigating network slowdowns associated with monitoring systems. However, deficiencies of current methods make accurately and efficiently determining network latency difficult.

Current methods rely on either active or passive means. Active monitoring systems periodically transmit traffic across the network. Once the active monitoring system gathers data, the system determines several network metrics, sometimes including network latency. Traditional passive monitoring systems observe data being sent on network devices to gather network performance metrics. However, both methods suffer from several drawbacks.

Data sent from active monitoring systems may burden network infrastructure, such as routers or network switches, and network endpoint devices such as printers, faxes, or computers. The endpoint devices must have adequate resources to handle incoming test transmissions.

Also, in order to determine network latency accurately, monitoring systems must conduct a large scale test of the whole network. Large scale testing may increase the load on the network. Large scale testing may interrupt or slow down actual network communications. However, if an active monitoring system does not conduct a large scale test, the system may garner useless data that does not accurately reflect real network performance. For instance, if the traffic sent by an active monitoring system does not match real network data, the traffic may be routed or prioritized differently, resulting in meaningless metrics. Reliably anticipating the types of data that may be transmitted across a network presents another serious challenge for test designers. Thus, when using active monitoring systems, testers may need to make difficult network performance/data reliability trade-off decisions.

IT professionals may consider using traditional passive monitoring systems as well. Traditional passive monitoring systems demand probes installed throughout the network to effectively monitor traffic through the entire network. Each probe is responsible for monitoring a specific location or a few locations (typically 4-8) using span traffic. Many probes are required to provide general visibility into moderate to large computer networks. This approach adds considerable expense in terms of the monitoring equipment and the resources necessary to maintain it. Further, most networking devices have a limited number of span ports available (typically 1-2). Dedicating a span port to latency monitoring makes it unavailable to other uses such as packet capture and traffic analysis.

Network infrastructure devices often aggregate network traffic summary information and export this information in the form of flow-based packets. Flow processors operating on network infrastructure devices generate flow-based packets to record network traffic information. Although processes such as overall traffic monitoring, device resource allocation and accounting often use these packets, current methods do not efficiently and accurately use this flow-based information to calculate network latency.

BRIEF SUMMARY OF THE INVENTION

Therefore, a need has arisen for a network latency calculation system which provides universal network coverage, gathers real data, and does not cause network slowdowns or add unnecessary network traffic. In accordance with the disclosed subject matter, a system, method, and computer readable medium for calculating network latency is provided that substantially reduces disadvantages and problems associated with previously developed monitoring systems.

The disclosed subject matter provides a method, system, and computer readable storage medium to leverage existing network infrastructure to compute network latency across the network. By collecting traffic information already gathered from network infrastructure devices, the present disclosure enables efficient and accurate network latency calculations.

More specifically, the disclosed subject matter provides a method for calculating network latency based on data obtained from flow records such as, but not limited to, those contained in NetFlow, JFlow, SFlow, or IPFIX packets.

The presently disclosed subject matter provides a method, system, and computer readable medium requiring very little additional infrastructure to achieve extensive visibility into network performance; this ability represents a technical advantage of the disclosed subject matter. An additional technical advantage includes the ability to use passive techniques to monitor network activity, thereby, mitigating increases in network traffic load. In addition, the teachings of the present disclosure provide the ability to measure real data gathered in real-time. Further, the present disclosure does not necessitate the need for synchronization between device clocks; the present disclosure reduces complexity.

These and other advantages of the disclosed subject matter, as well as additional inventive features, will be apparent from the description provided herein.

This summary is not intended as a comprehensive description of the claimed subject matter but, rather is intended to provide a short overview of some of the matter's functionality. Other systems, methods, features and advantages of the invention will be or will become apparent to one with skill in the art upon examination of the following FIGUREs and detailed description. It is intended that all such additional systems, methods, features and advantages be included within this description, be within the scope of the invention, and be protected by the accompanying claims.

BRIEF DESCRIPTION OF DRAWINGS

For a more complete understanding of the presently disclosed subject matter and the advantages thereof, reference is now made to the following brief descriptions taken in conjunction with the accompanying FIGUREs, in which like reference numerals indicate like features wherein.

DETAILED DESCRIPTION OF THE ILLUSTRATED EMBODIMENTS

Figure 1:
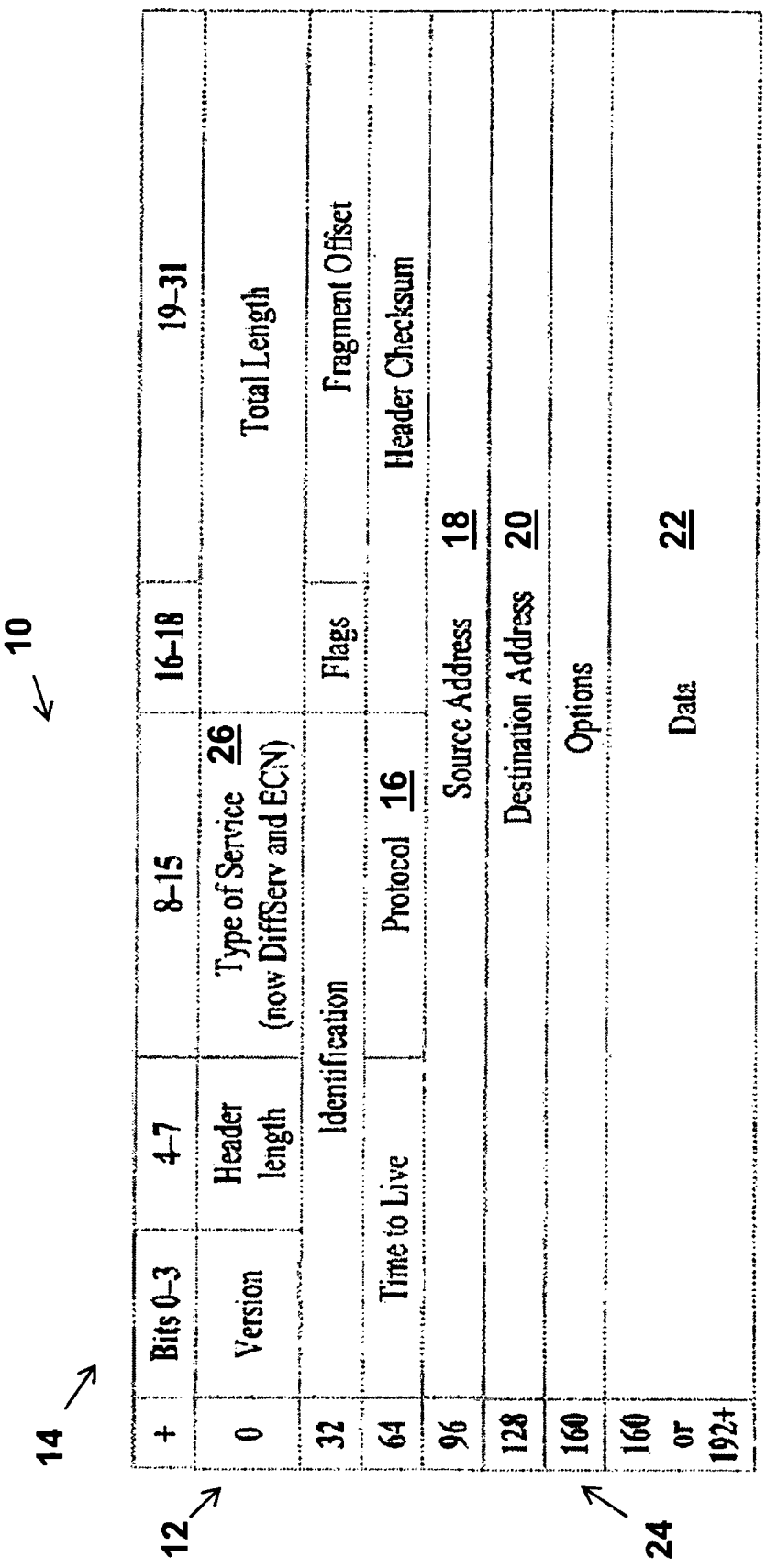
FIG. 1 shows a typical IPv4 packet.

Preferred embodiments of the disclosed subject matter are illustrated in FIGURES, like numbers being used to refer to like and corresponding parts of the various drawings.

Although described with particular reference to a computing environment that includes personal computers (PCs), a wide area network (WAN) and the Internet, the claimed subject matter can be implemented in any information technology (IT) system in which it is necessary or desirable to monitor performance of a network and individual system, computers and devices on the network. Those with skill in the computing arts will recognize that the disclosed embodiments have relevance to a wide variety of computing environments in addition to those specific examples described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, PC or mainframe.

All references, including publications, patent applications, and patents, cited herein are hereby incorporated by reference to the same extent as if each reference were individually and specifically indicated to be incorporated by reference and were set forth in its entirety herein.

In the context of this document, a "communications device" can be any means that at least stores, transmits or propagates, and receives digital or analog information. A "network infrastructure device" can be any means that at least receives and transmits digital or analog information. A "connection" may be any communication that intends to setup traffic between two communications devices. A "flow", "traffic flow", "network flow", or "network traffic flow" refers to a series of communications packets occurring as a result of the same initial connection set-up between two communications device.

In the context of this document, a "memory," "recording medium" and "data store" can be any means that contains, stores, communicates, propagates, or transports the program and/or data for use by or in conjunction with an instruction execution system, apparatus or device. Memory, recording medium and data store can be, but are not limited to, an electronic, magnetic, optical, electromagnetic, infrared or semiconductor system, apparatus or device. Memory, recording medium and data store also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Typically, two protocols, the Internet Protocol (IP) and Transmission Control Protocol (TCP), provide a means for reliably transmitting data across a network. Both form the core of the Internet Protocol Suite. While IP typically handles lower-level communications from device to device, TCP provides a means for communicating between the original sending and the original receiving devices. TCP/IP transmits data by fragmenting it into smaller more manageable chunks known as packets. TCP/IP further enhances communications between devices by ensuring packets are delivered intact, in the correct order, and without duplication. Other protocols exist that serve the same functions as IP (network layer protocols) and TCP (transport layer protocols). Given the popularity of IP and TCP, these two are used herein as examples. One having ordinary skill in the art will recognize the principles and teachings of the present disclosure could be applied to other protocols serving the same purpose as TCP/IP.

FIG. 1 shows a typical IPv4 packet 10. Although specific reference has been made herein to IPv4 other versions of IP such as IPv6, and indeed other network-layer or lower-layer protocols, may also be used. Packet 10 is divided into fields, wherein each field can be accessed using bit offset row 12 and bit column 14. Packet 10 includes a header section 24 and a data section 22. Header section 24 includes a number of fields specifically protocol 16, source address 18, destination address 20, and type of service 26.

Protocol field 16 gives the protocol used in data section 22. For example, for TCP, protocol field 16 provides a value of six (6). Source address 18 provides the sender of the packet 10's address. It is important to note that this address may not be the "true" or original sender of packet 10. For example, source address 18 may represent the address of an intermediate network infrastructure device passing the packet to the "true" destination or just to another network infrastructure device. Destination address 20 gives the address of the receiver of packet 10. Again, it is important to note that destination address 20 may not be the "true" receiver, but may be an intermediate network infrastructure or other device.

Figure 2:
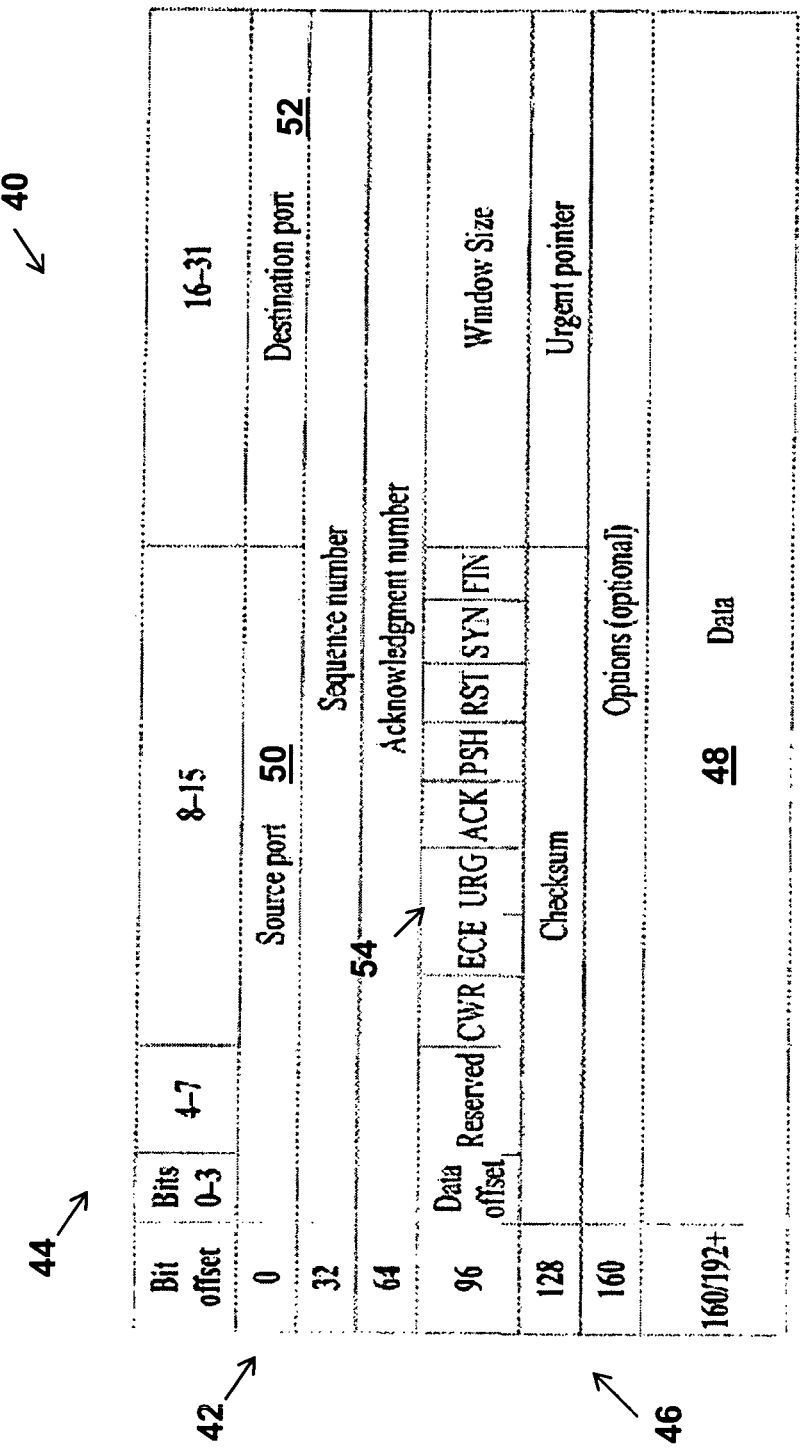
FIG. 2 provides an exemplary TCP segment packet.

Data section 22 furnishes the data being sent through IP, and in the case of the present disclosure TCP data. FIG. 2 illustrates a typical TCP segment 40 that may be transmitted using data section 22. Bit offset row 42 and bit column 44 may be used to access a specific field within TCP segment 40. TCP segment 40 includes header section 46 and data section 48.

Header section 46 includes a number of fields specifically source port 50, destination port 52. Further, beginning at bit offset row 96 and bits column 8-15, TCP Segment 40 shows flags 54. Data section 48 transmits data to be sent from sending device to receiving device.

Figure 3:
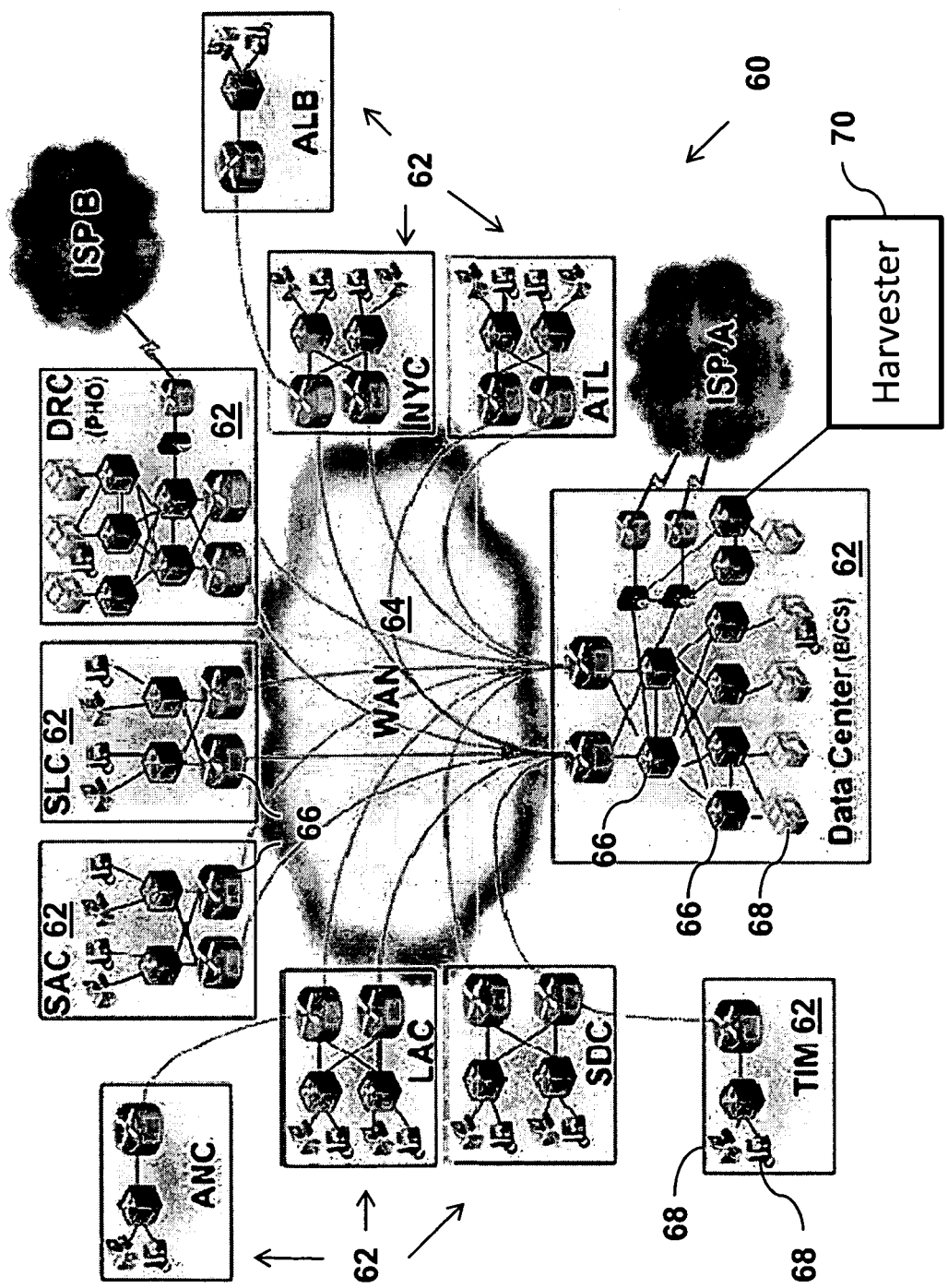
FIG. 3 illustrates an example of a computer network having a number of network infrastructure devices.

FIG. 3 shows exemplary network 60 wherein the disclosed subject matter may be operated. Although specific reference is made to network 60, the teachings of the present disclosure may be applied to a number of different networks such as LANs, WANs, and MANs having a number of heterogeneous communications devices and network infrastructure devices. Network 60 shows data centers 62 connected through WAN 64. Network infrastructure devices 66 connect communications devices 68 to WAN 64. Network infrastructure devices 66 may include devices such as routers, switches, servers, packet shapers, and other devices able to transmit and receive data. Communications devices 68 could include devices such as computers, servers, faxes, and printers. Other devices which may practice the teachings of the present disclosure may be known to those with ordinary skill in the art.

Network infrastructure devices 66 process data between communications devices 68 using TCP/IP or other communications protocols. Network Infrastructure devices 66 generate records based on packet information discussed in FIGS. 1 and 2, and typically export this information in the form of flow-based packets. Flow records aggregate a series of end-system packets sharing similar fields into flows. Each flow record provides a summary of traffic information resulting from a conversation between two devices. In one embodiment, a network infrastructure device aggregates packets based on the following fields:

1. Incoming Interface
2. Type of Service (26 FIG. 1)
3. Protocol (16 FIG. 1)
4. Source IP address (18 FIG. 1)
5. Destination IP address (20 FIG. 1)
6. Source Port (50 FIG. 2)
7. Destination Port (52 FIG. 2)

When a packet arrives at one of network infrastructure devices 66, it analyzes the packet information and matches it to an existing flow using the above criteria. Network infrastructure device 66 then updates the flow record by incrementing the number of packets in the flow, incrementing the number bytes in the flow, and updating the finish time for the flow (as examples). For TCP packets, network infrastructure device 66 additionally typically updates the flags (54 FIG. 2) seen for the entirety of the flow. Network infrastructure devices 66 may update flags by logically OR-ing flags in the new packet with flags already set in the existing flow.

However, if no match can be found, network infrastructure device 66 creates a new flow. Network infrastructure device 66 additionally marks the flow with a time stamp to mark the beginning of the flow. Flows also aggregate additional information to be discussed herein.

The flow processing typically continues until the flow ends, is inactive, exceeds a time limit, or processing cache becomes full. Certain flags (54 FIG. 2) within a packet, such as FIN or RST, terminate the flow. Network infrastructure devices 66 consider a flow inactive when no new packets have been observed for a pre-determined time. Network infrastructure devices 66 may incrementally update flows or create incremental flows for flows that exceed their time limit.

Typically, network infrastructure devices 66 periodically export flow records in the form of flow-based packets (e.g. IPFIX packets) to other devices on network 60. It is also possible to access the flow records without receiving the flow-based packets. In one embodiment, network devices make flow records available (either through flow-based packet export or other means) to harvester 70. In another embodiment, harvester 70 retrieves flow records from network infrastructure devices, endpoint devices, or other devices on the network having a flow processor. The records could also be retrieved from a central server rather from on the flow processor device itself.

Harvester 70 may aggregate and analyze flow records to compute latency. For the purposes of the present disclosure harvester 70 may be a device for gathering flow records. In addition, harvester 70 implements the latency calculating teachings of the present disclosure. In one embodiment, harvester 70 is implemented through a DELL™ Poweredge™ 1950 Server. Data exported from network infrastructure devices can be captured and stored on harvester 70. The particular flow records of the present disclosure may then be analyzed as prescribed.

Using the teachings of the present disclosure, latency may be calculated between a network infrastructure device and an endpoint device or between two intermediate network infrastructure devices. Further, roundtrip latencies may be computed for devices throughout the network. In addition, one-way latencies between devices on the network may be approximated.

Figure 4:
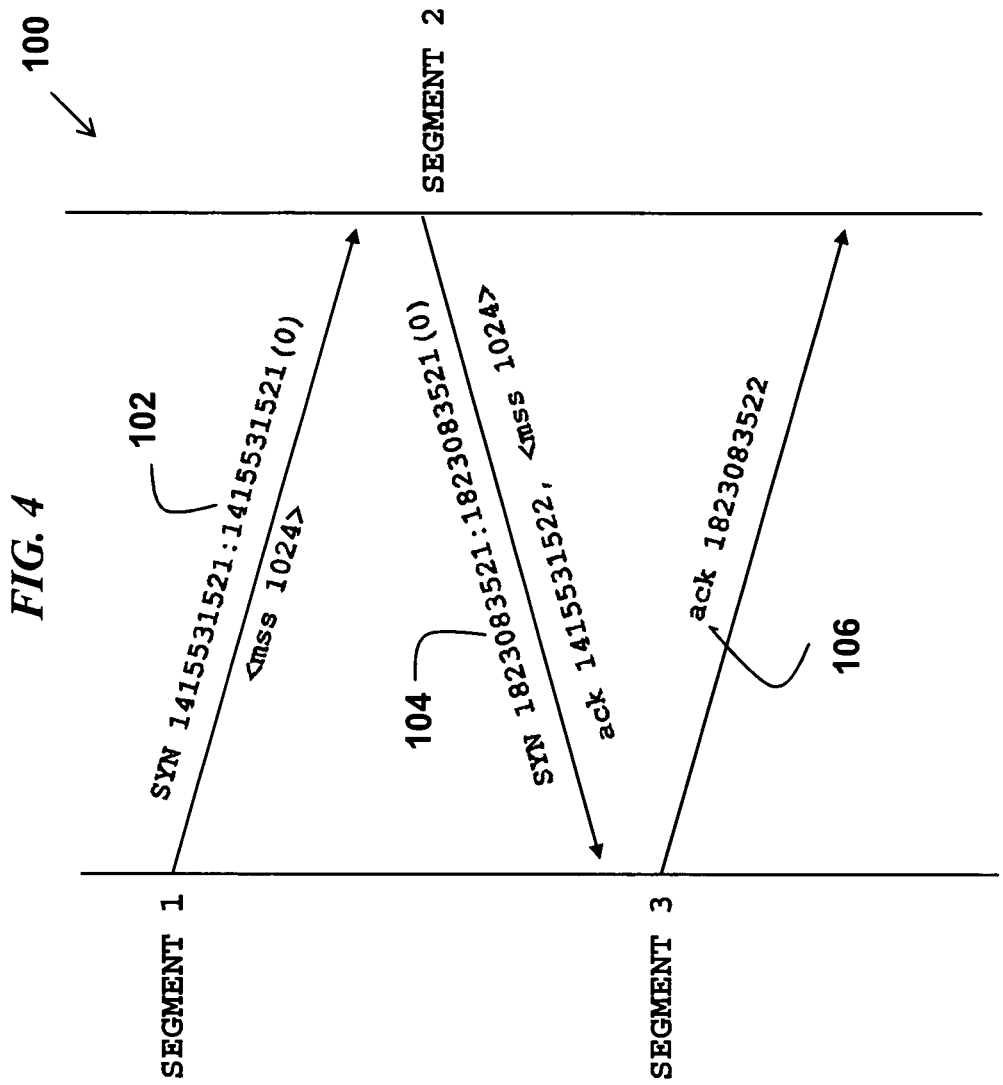
FIG. 4 provides a descriptive drawing of a typical TCP connection setup exchange.

FIG. 4 illustrates a typical TCP connection setup exchange 100. FIG. 4 shows packets 102, 104, and 106 responsible for the initial network connection setup. When one communications device connects to another, it initially requests a connection by sending packet 102 having the SYN flag. The SYN flag of packet 102 acts as a connection-setup indicator, beginning the connection. Other protocols may implement different connection-setup indicators, but the general principles of the present disclosure still apply. For example, other protocols may send the SCTP INIT chunk type noting the beginning of a connection. Packet 102 begins the flow of traffic or begins a conversation in one direction. No other packet in the same conversation and direction between these two devices includes the SYN flag. In response to the connection request, the second device sends response packet 104 having SYN and ACK flags as connection-setup acknowledgment. In other protocols, a different connection-setup acknowledgment packet or flag such as the SCTP INIT ACK chunk may be set. No other packet in the same conversation and direction between these two devices includes the SYN flag. Packet 104 begins the flow for communications or begins the conversation for a second flow in the opposite direction. Note that herein we use TCP as an example of a connection-oriented transport-layer protocol; the approach can be generalized to apply to any connection-oriented protocol so long as the exported flow record contains information pertaining to the connection establishment (e.g., uses a flag to indicate SCTP init chunk or init-ack chunk is present).

A device may create and make available flow records having flow information based on packets 102, 104, and 106. Devices create flow records detailing the traffic in each direction (from/to an endpoint) using flow engines or flow processors. Devices ascribe successive packets to the correct flow based on criteria described herein. For example, packet 106 which completes the connection may be appended to the same flow as packet 102.

Typically, conversations initiated by connection setup exchange 100 last for only a few seconds. Network infrastructure devices usually set a flow to expire on the order of thirty (30) seconds to thirty (30) minutes. With this in mind, it is important to note that a large percentage of flows will have the SYN flag set, ensuring a large sample size.

Flow records associated with packets 102 and 104 provide important information for latency calculations. Since packet 102 includes the SYN flag, in most cases the destination device immediately acknowledges and transmits response packet 104. The sending and receiving communications devices do not send intermediate packets to each other between packets 102 and 104. Thus, packets 102 and 104 begin flows for their respective direction of communication. Since these flows also have a time stamp for the start of the flow, they present a reliable means for calculating latency.

Figure 5:
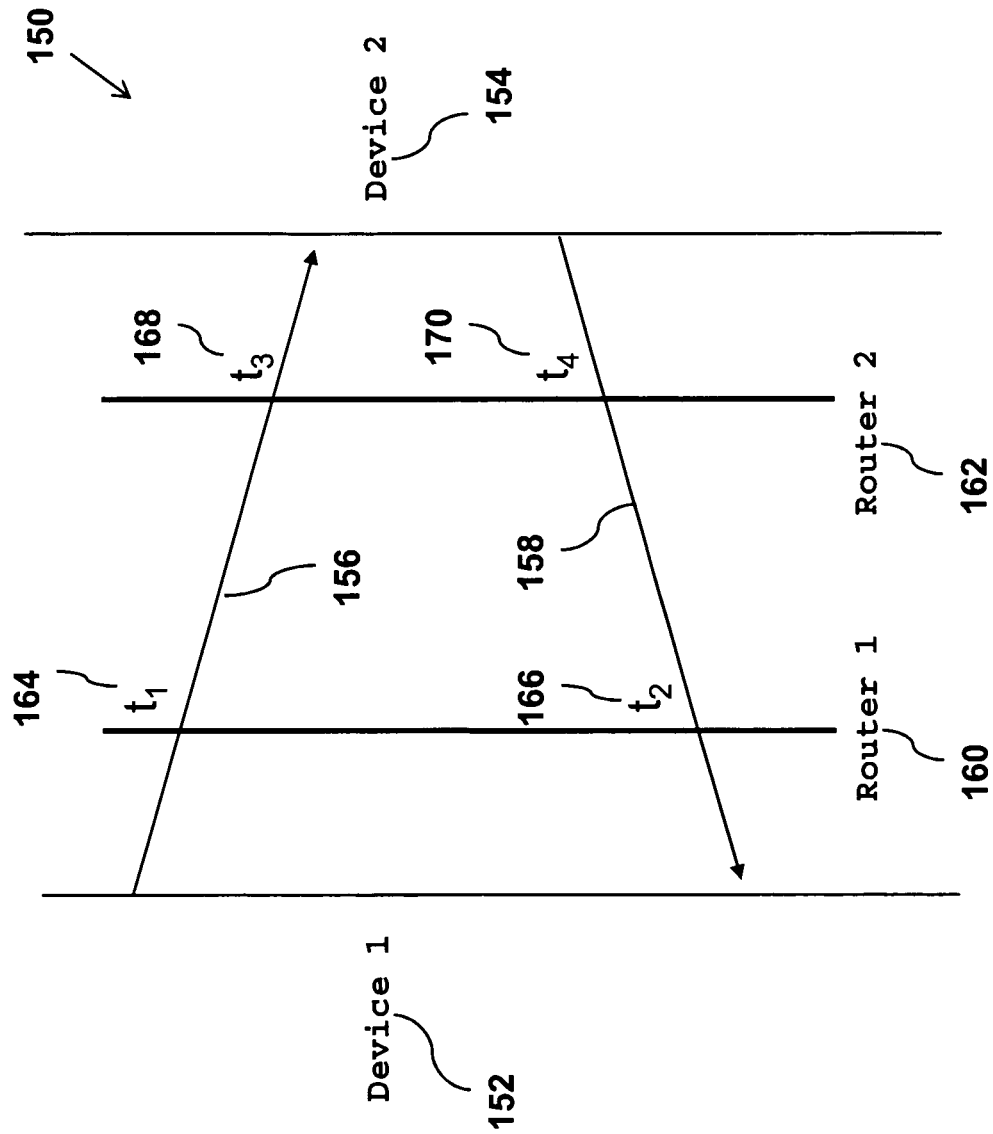
FIG. 5 shows an example of network traffic traveling across a network.

FIG. 5 shows exemplary network 150 of the present disclosure. Device 1 152 and device 2 154 communicate through router 1 160 and router 2 162. Routers 160 and 162 generate flow records based on traffic 156 and 158. An additional device (not shown), such as harvester 70 or collector, may gather flow records generated by routers 160 and 162 to compute latency. Time stamps $t_1$ 164 and $t_2$ 166 represent the times when packets 102 and 104 of FIG. 4 pass through router 1 160. Similarly, time stamps $t_3$ 168 and $t_4$ 170 represent the times when packets 102 and 104 of FIG. 4 pass through router 2 162.

Referring back to FIG. 5, harvester 70 (FIG. 3) may use flow records having time stamps $t_1$ 164 and $t_2$ 166 to compute latency between router 1 160 and device 2 154. Since router 2 162 generates flow records using the same traffic as router 1 160, harvester 70 may also compute the latency between router 2 162 and device 2 154 using flow records generated by router 2 162. The difference between time stamps $t_1$ 164 and $t_2$ 166 ($t_2-t_1$) denotes the round-trip latency between router 1 160 and device 2 154. Similarly, the difference between time stamps $t_3$ 168 and $t_4$ 170 ($t_4-t_3$) denotes the round-trip latency between router 2 162 and device 2 154.

Further, since the same traffic formed the basis of both latency calculations, harvester 70 may calculate the latency between router 1 160 and router 2 162 by taking the difference between the latencies discussed heretofore (($t_2-t_1$)−($t_4-t_3$)).

Since router 1 160 generated time stamps $t_1$ 164 and $t_2$ 166, no clock synchronization is required for computing latency between router 1 160 and device 2 154. The same principle applies to time stamps $t_3$ 168 and $t_4$ 170. Further, since only the differences between time stamps (($t_2-t_1$) and ($t_4-t_3$)) are required to compute latency between routers, the proposed method does not require clock synchronization between routers 160 and 162.

Also, harvester 70 may calculate one-way latency between devices on the network. For example, harvester 70 can calculate one-way latency between router 1 160 and device 2 154 based on the roundtrip latency divided by two (($t_2-t_1$)/2). Also, harvester 70 may calculate one-way latency between router 1 160 and router 2 162 using the same principle ([($t_2-t_1$)−($t_4-t_3$)]/2). This method relies on assuming that time between devices is evenly split in each direction. Although this may not always be correct, the method does provide a reasonable estimate for calculating one-way latency. In this way, harvester 70 may calculate latencies, either one-way or round-trip, to create a mapping of latency across the entire network.

Based on latency information calculated by harvester 70, remedial actions may be suggested to network infrastructure devices. For example, different network paths or hops can be suggested to increase processing efficiency.

Differences between time stamps 164, 166, 168, and 170 may be on the order microseconds, milliseconds, or seconds depending on the size of network 150. For example, if network 150 is implemented on a LAN, the differences between time stamps 164, 166, 168, and 170 may be in the microseconds or tens of milliseconds. If network 150 is implemented in a WAN, the difference between time stamps 164, 166, 168, and 170 may range between tens of milliseconds or hundreds of milliseconds. If data traveling across network 150 must be transmitted through a satellite, difference between time stamps 164, 166, 168, and 170 may range between hundreds of milliseconds or seconds. Typically, flow processors report time stamps in the range of milliseconds.

Network infrastructure devices, endpoint devices, or other devices on the network having flow processors including, but not limited to, JFlow, SFlow, IPFIX, and NetFlow generate flow records summarizing packets sent across the network. Network infrastructure devices generate these network traffic summary records and export them in the form of flow-based packets. In another embodiment, harvester 70 may retrieve flow records from the network infrastructure device or other devices on the network through a pull technology.

Typically, flow processors aggregate traffic information for a pre-determined amount of time. Network infrastructure devices then export flow-based packets having a flow based on initial TCP/IP connection setup. For example, an infrastructure device may monitor network traffic for one (1) minute or several minutes and export each update as an incremental flow.

In one embodiment, the network infrastructure device generates flow records for only a select percentage, or sample, of flows. For example, a network infrastructure device may maintain a flow record in response to every $n^{th}$ packet. Of these flow records, only a certain percentage may include a packet having the SYN flag set and the others may be incremental flows. Harvester 70 of the present disclosure gathers flow records created by network devices. Harvester 70 then discards those flow records that do not include the SYN flag set and compares the remaining flow records for matches.

For each flow, an exemplary flow processor may report the following fields:
1. Version number
2. Sequence number
3. Input and output interface indices used by SNMP
4. Time stamp for the flow start and finish time, in milliseconds since the last boot.
5. Number of bytes and packets observed in the flow
6. Layer 3 headers:
   a. Source and destination IP addresses b. Source and destination port numbers
c. IP protocol
d. Type of Service (ToS) value
7. In the case of TCP flows, the union of all TCP flags observed over the life of the flow.
8. Layer 3 Routing Information:
   a. IP address of the immediate next-hop (not the BGP next hop) along the route to the destination.
   b. Source and destination IP masks (prefix lengths in CIDER notation Each flow represents a sequence of packets from one device to another over a period of time. A TCP conversation between two communications devices results in the creation of two flows; the traffic from each device (to the other) maps to a different flow. Infrastructure devices may create multiple incremental flows to report the traffic. For example, the infrastructure device may create a flow for each minute of the conversation. They may then export this information in the form of flow-based packets.

The infrastructure device can export the data, typically via User Datagram Protocol (UDP) or Stream Control Transmission Protocol (SCTP). The UDP or SCTP header information on the exported data includes the infrastructure device IP address. Also, headers exported with the flow contain information indicating the engine ID reporting traffic. A network infrastructure device may report flows between multiple communications devices. The present disclosure implements harvester 70 or collector to gather flow records from a number of network infrastructure devices. The present disclosure teaches a method for using harvester 70 to gather flow records and then use the process steps here described for calculating latency.

It is important to note that incremental flows not having the equivalent of the TCP SYN flag set may be discarded by harvester 70. Since these flows do not include the SYN flag set and are not part of the original TCP/IP (or similar) setup exchange discussed heretofore, they may not have relevant time stamps. In this spirit, harvester 70 may discard these flows to increase processing efficiency. In this way, harvester 70 only computes latency based on flows having the correct time stamps.

In one embodiment, harvester 70 generates a hash table based only on flows having the SYN flag set. Harvester 70 may then compare and match corresponding flows to compute latency between devices. Other methods for storing and sorting flows may be known to those with ordinary skill in the art.

Figure 6:
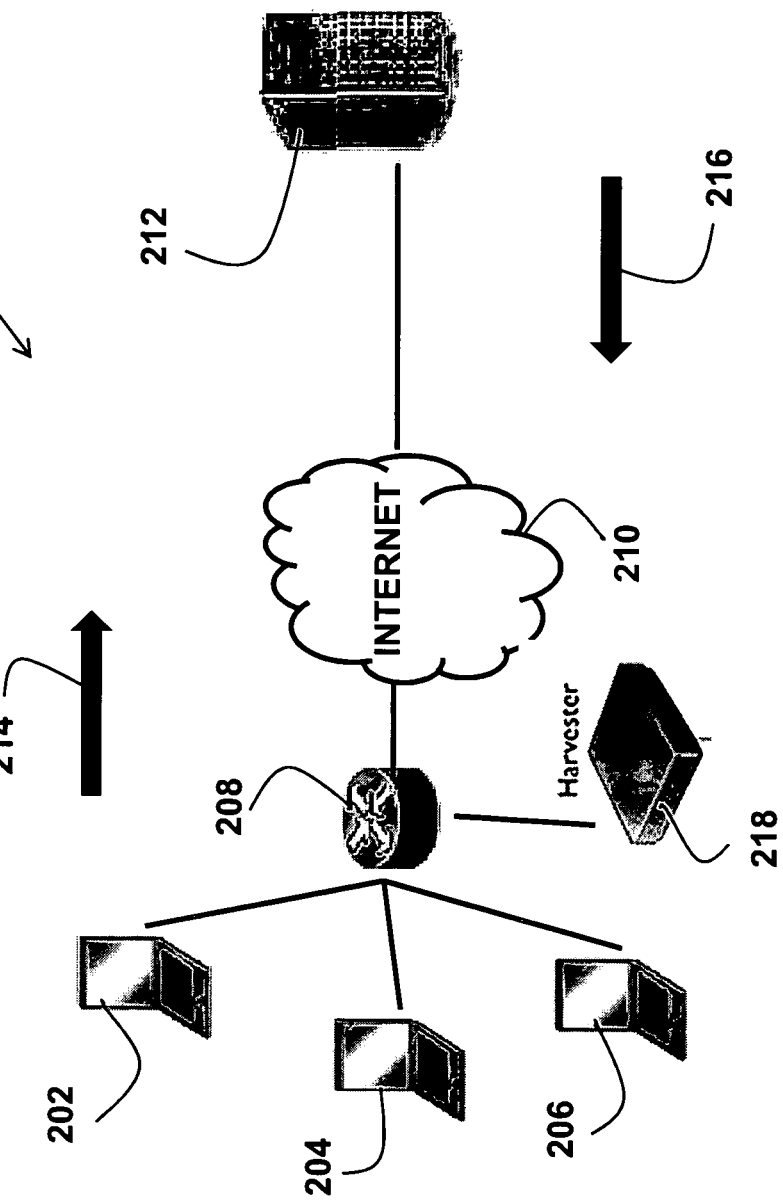
FIG. 6 provides an illustration of an exemplary network of the present disclosure.

FIG. 6 illustrates exemplary network 200 of the present disclosure. Computers 202, 204, and 206 connect to internet 210 through router 208. Computers 202, 204, and 206 may then connect to communications devices such as e-mail server 212. Harvester 218 may gather flow records from router 208 to compute latency between devices on the network. Harvester 218 may either request flow records from router 208 or router 208 may automatically send flow records in the form of flow-based packets to harvester 218. Traffic between computer 202 and e-mail server 212 results in two flows 214 and 216. Flow 214 provides information regarding traffic proceeding from computer 202 to e-mail server 212. Flow 216 provides information regarding traffic proceeding from e-mail server 212 to computer 202. Although specific reference is made to computers connecting to the internet through routers for the present example, the discussion is purely for example purposes and other network configuration wherein the present disclosure is applicable may be apparent to those having ordinary skill in the art. For example, one could configure a local area network (LAN) having multiple heterogeneous communications devices such as printers, faxes, servers, computers, routers, or switches.

When any of computers 202, 204, or 206 connect to e-mail server 212 a TCP session must first begin. An initial packet including the SYN flag marks the beginning of the connection. Although there may be re-transmissions of the original packet, the SYN flag marks only the initial 3-way handshake connection setup discussed in FIG. 4 and does not mark any other intermediate packets. Thus, a packet having the SYN flag can be assumed to mark the beginning of a flow in the given direction. Only these packets will be considered when determining network latency.

In order to determine latency, the method of the present disclosure matches flows resulting from the same initial connection setup (via any connection-oriented protocol whose observed connection setup event is flagged in some manner in the flow record). Since flow records also provide the start times, latency between devices may be calculated. To calculate network latency, the flows are matched based on the following relationships:

| | |
|---|---:|
| Network infrastructure device(1)=Network infrastructure device(2) | 1. |
| Flow engine ID(1)=Flow engine ID(2)(if applicable) | 2. |
| Source IP address(1)=Destination IP address(2) | 3. |
| Destination IP address(1)=Source IP address(2) | 4. |
| Source port(1)=Destination port(2) | 5. |
| Destination port(1)=Source port(2) | 6. |
| Starting time stamp(1)<Starting time stamp(2)<Ending time stamp(1) | 7. |

The discussion will proceed with the example set forth in FIG. 6. In this case, computer 202 connects to e-mail server 212 through router 208 and internet 210. Computer 202 sends an initial packet, which includes the SYN flag, requesting connection to e-mail server 212. The packet will mark the beginning of flow 214 from computer 202 to e-mail server 212. Router 208, which processes the initial packet, generates a flow record to summarize traffic. In flow 214, router 208 will be recorded as the network infrastructure device. In other words, router 208 will be marked Network infrastructure device (1). Router 208 can be identified since the IP address of the infrastructure device will be exported, through UDP or SCTP header information, with the flow-based packets as described heretofore (or the flow records are retrieved directly from router 208 using its IP address).

From the flow record associated with flow 214, other information includes source IP address(1) or the IP address of computer 202, Destination IP address(1) or the IP address of e-mail server 212, Source port(1) for computer 202, and Destination port(1) for e-mail server 212. The same process can be used to determine values for flow 216 from e-mail server 212 to computer 202. To ensure a correct match has taken place, the beginning time stamp for flow 216 (starting time stamp(2)) must occur between the beginning (starting time stamp(1)) and ending time stamp (ending time stamp (1)) of flow 214, indicating that the flows captured the same session startup. If this criterion does not hold, the flows represent different sessions; hence, they cannot be used to compute latency. Harvester 218 may match flows based on flow engine IDs as well, which are typically provided with the flow records.

Once two flows have been matched, the method of the present disclosure determines latency by comparing their time stamps; harvester 218 subtracts the start time stamp of the flow with the earlier time stamp 214 from the start time stamp of flow with the later time stamp 216. Since the same flow engine on the same device creates the time stamps, in this case router 208, the method of the present disclosure does not require clock synchronization. In this embodiment, harvester 218 determines an intermediate-to-endpoint latency between router 208 and e-mail server 212. The flow with the earlier time stamp indicates which device initiated the conversation. The initiator is typically described as the client and the responding device is the server. In this, way client server roles may be determined.

Determination of servers on the network may be important not only for calculating and measuring latency, but also for enabling security features and other management functions. The inventors herein contemplate the use of this feature for enabling security features, however further study may be needed to fully understand and implement the server determination feature for security or management purposes.

In one embodiment, the server determination may be used to identify servers on the network and prevent malicious entities from masquerading as servers. For example, typically devices reserve port 80 for web traffic. A malicious entity may connect to port 80 and masquerade as a server while spreading malicious content to the device. With the server determination feature discussed above, these malicious devices may be determined as unique from actual servers on the network and appropriate action may be taken.

Harvester 218 may also determine an endpoint-to-endpoint latency if e-mail server 212 initiated a connection with computer 202. In this way, harvester 218 may determine an intermediate-to-endpoint connection between router 208 and computer 202. Adding the two intermediate-to-endpoint latencies (router 208 to e-mail server 212 and router 208 to computer 202) results in an endpoint-to-endpoint latency between computer 202 and e-mail server 212.

Further, harvester 218 may use subnet addresses to approximate latency between computer 202 and e-mail server 212. Since computers 202, 204, and 206 operate on the same subnet, harvester 218 may employ a message from this subnet and a message from the subnet of server 212 to approximate latency between computer 202 and server 212 rather than messages directly from computer 202 and server 212.

Figure 7:
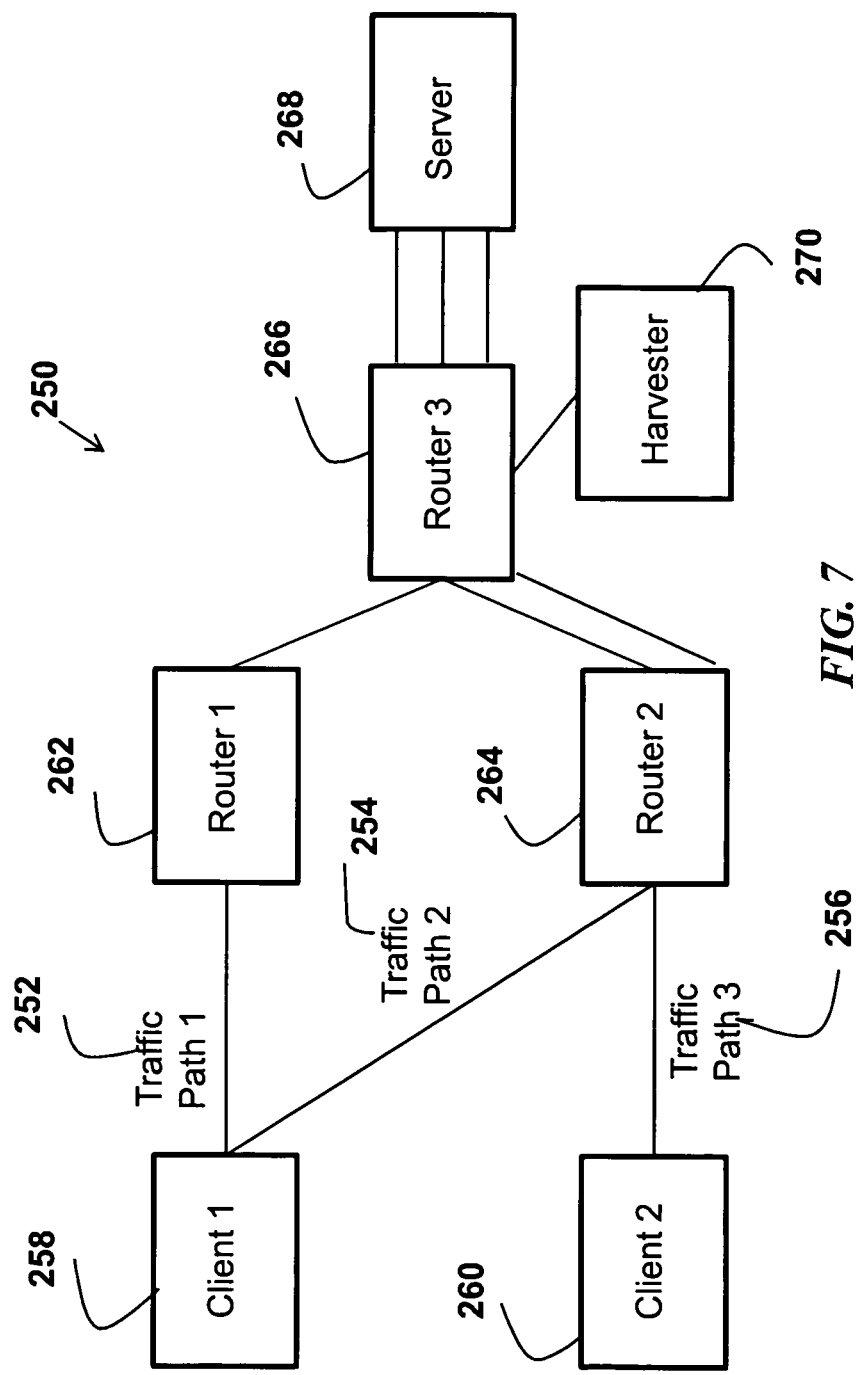
FIG. 7 discloses one implementation of the teachings of the present disclosure.

FIG. 7 presents another exemplary network 250 of the present disclosure. Network infrastructure devices 262, 264, and 266 connect client devices 258 and 260 to server 268. In this example, packets sent from client devices 258 and 260 may travel along three (3) traffic paths 252, 254, and 256. Network infrastructure devices 262, 264, and 266 record information about traffic in each traffic path based on the criteria described heretofore.

Each network infrastructure device generates at least two flow records for each bi-directional conversation that passes through it (one for each direction). Network infrastructure devices may also generate incremental flows that include some of the same information as the original flow. However, the incremental flows will not have the SYN flag set. Thus, these incremental flows may not include relevant time stamps. Harvester 270, which gathers flow records generated by network infrastructure devices, may discard flows without the SYN flag set to ensure that matched flows include the correct time stamps. The reader will note that discarding flows which do not include the SYN and ACK flag sets is not necessary, but intended to improve the data set for efficiency in comparisons. In this way, harvester 270 ensures that processing and computing network latency proceeds efficiently and accurately.

For example, network infrastructure device 262 generates one flow for traffic flowing from client device 258 to server 268 and one flow for traffic flowing from server 268 to client device 258. Latency may be directly calculated for the following devices:

(1) Network infrastructure device 262 to server 268 based on traffic path 252.
(2) Network infrastructure device 264 to server 268 based on traffic path 254 or 256.
(3) Network infrastructure device 266 to server 268 based on traffic path 252, 254, or 256.

Further, latency may be indirectly calculated between a number of devices on network 250. For example, latency between network infrastructure device 262 and server 268 is known based on traffic path 252. Further, latency between network infrastructure devices 266 and server 268 is also known based on traffic path 252. Since these two devices report information regarding the same traffic path, latency between these two devices may be calculated as explained heretofore. In this way, latency may be calculated between network infrastructure devices 264 and 266 based on traffic path 254 or traffic path 256. If two flows pass along the same traffic path, harvester 270 may calculate an intermediate-to-intermediate latency.

Figure 8:
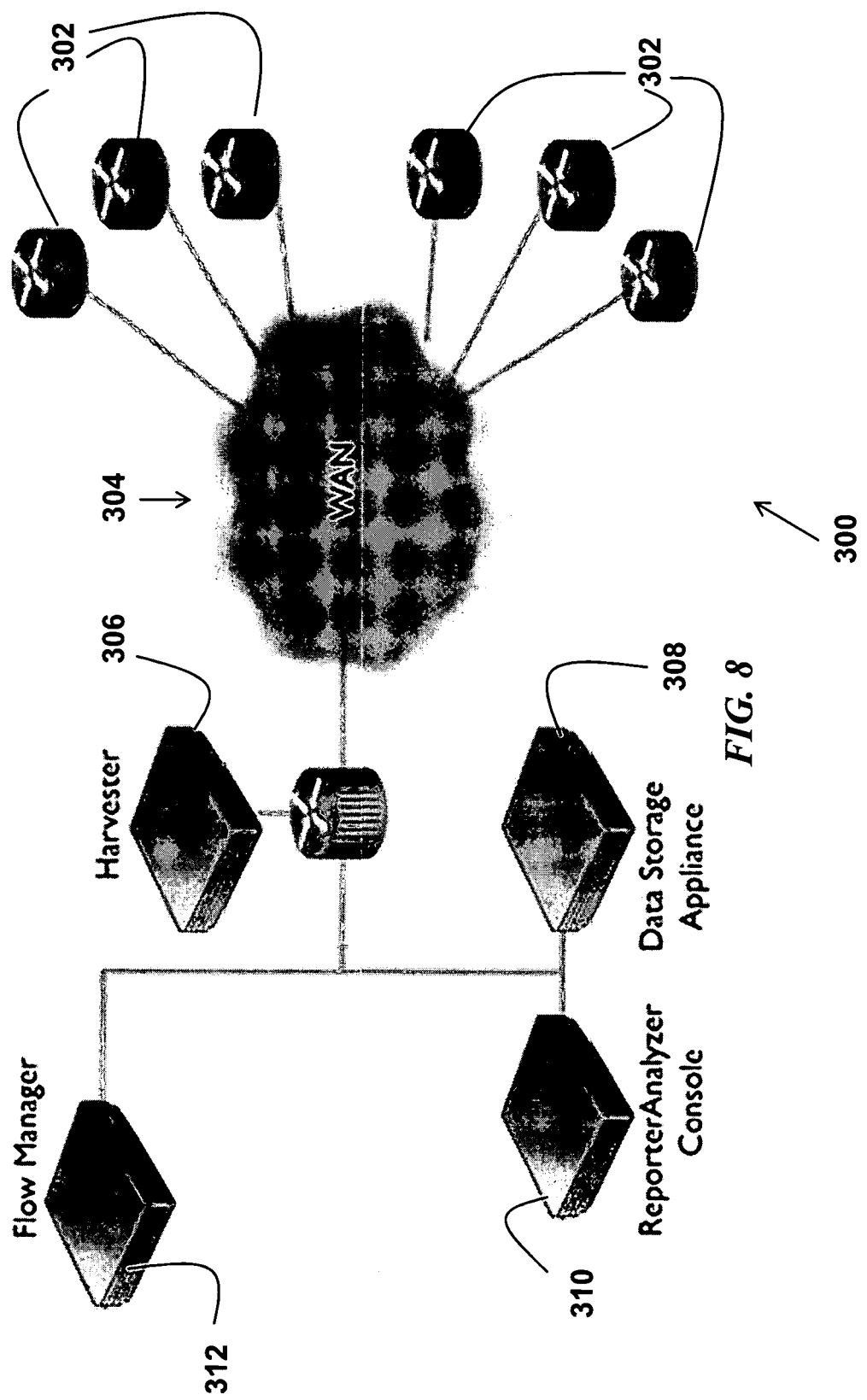
FIG. 8 discloses one implementation of the teachings of the present disclosure.

FIG. 8 presents another exemplary network 300 of the present disclosure for computing latency. Routers 302 connect devices on WAN 304 and provide flow records to harvester 306. Harvester 306 collects flow records from multiple routers 302 ensuring wide network coverage. Harvester 306 further analyzes the flow records to compute round-trip time from infrastructure devices to endpoints, round-trip time between infrastructure devices, one-way time between infrastructure devices and endpoints, and one-way time between infrastructure devices. Using these latencies, harvester 306 may create a mapping of network latencies. Other devices such as data storage appliance 308, ReporterAnalyzer console 310, and flow manager 312 perform functions such as data storage, SNMP polling to retrieve device information, and reporting. Harvester 306, flow manager 312, data storage appliance 308, and reporter analyzer console 310 can be deployed as separate servers or combined onto one or more servers.

The teachings of the present disclosure enable universal network coverage by analyzing flow records created by network devices deployed throughout the network. Harvester 70 may gather, store, and processes flow records to compute network latency between endpoint devices, infrastructure devices, or other communications devices deployed throughout the network.

The teachings of the present disclosure further enable efficient and accurate network latency calculations by gathering, storing, and processing flow records already produced by network infrastructure devices rather than using active means to generate traffic summary information.

Information gathered, stored, and processed through the teachings of the present disclosure may be used in other applications known in the prior art. For example, a graphical user interface (GUI) may use the flow records and latency calculations to graphically display congested network areas. In another embodiment, harvester 70 may export relevant information to another server or database for further processing and application of remedial solutions to congested network paths.

For example, the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A passive method for computing network latency through the use of flow records wherein the network comprises at least two endpoint devices and at least one network infrastructure device, the method comprising the step of:
   receiving flow records from at least one device, said flow records comprising at least two flows associated with a first transmission sent from a first communications device and a second transmission from a second communications device, said first transmission comprising a connection set-up indicator and said second transmission comprising a connection set-up acknowledgment indicator; wherein the flow records comprise at least a start time stamp and an end time stamp of the flow associated with said first transmission and at least a start time stamp and an end time stamp of the flow associated with said second transmission;
   matching said at least two flows;
   wherein said step of matching said at least two flows comprises the steps of:
      matching said at least two flows based on source IP addresses and destination IP addresses associated with each of said at least two flows;
      matching said at least two flows based on the IP protocol associated with each of said at least two flows;
      matching said at least two flows based on source ports and destination ports associated with each of said at least two flows;
      verifying that the start time stamp of the flow associated with said first transmission occurs prior to the start time stamp of the flow associated with said second transmission;
      verifying that the end time stamp of the flow associated with said first transmission occurs after the start time stamp of the flow associated with said second transmission;
   determining a intermediate-to-endpoint latency measure based on said time stamps; and
   storing said intermediate-to-endpoint latency measure on a computer readable storage medium.

2. The method of claim 1, said step of receiving further comprising the step of retrieving said flow records from said at least one device.

3. The method of claim 1, said step of receiving further comprising the step of exporting from said at least one devices at least one packet from the group consisting essentially of NetFlow, JFlow, Sflow, or IPFIX packets.

4. The method of claim 1, wherein said first transmission comprises a TCP SYN flag and said second transmission comprises a TCP SYN flag and a TCP ACK flag.

5. The method of claim 1, further comprising the step of matching flow engine identifications associated with each of said at least two flows.

6. The method of claim 1, further comprising the step of determining an endpoint-to-endpoint latency.

7. The method of claim 1, further comprising the step of determining an intermediate-to-intermediate latency.

8. The method of claim 1, further comprising the step of determining client server roles based on the time stamps associated with each of said at least two flows.

9. The passive method of claim 1, wherein the flow records provide traffic information and comprise aggregated packets based on a type of service, the IP protocol, the source IP addresses, the destination IP addresses, the source ports and the destination ports.

10. A non-transitory computer readable storage medium encoded with a program for passively computing latency through the use of flow records, said program comprising the steps of:
   receiving flow records from at least one device, said flow records comprising at least two flows associated with a first transmission sent from a first communications device and a second transmission from a second communications device, said first transmission comprising a connection set-up indicator and said second transmission comprising a connection set-up acknowledgment indicator; wherein the flow records comprise at least a start time stamp and an end time stamp of the flow associated with said first transmission and at least a start time stamp and an end time stamp of the flow associated with said second transmission;
   matching said at least two flows;
   wherein said step of matching said at least two flows comprises the steps of:
      matching said at least two flows based on source IP addresses and destination IP addresses associated with each of said at least two flows;
      matching said at least two flows based on the IP protocol associated with each of said at least two flows;
      matching said at least two flows based on source ports and destination ports associated with each of said at least two flows;
      verifying that the start time stamp of the flow associated with said first transmission occurs prior to the start time stamp of the flow associated with said second transmission;
      verifying that the end time stamp of the flow associated with said first transmission occurs after the start time stamp of the flow associated with said second transmission;
   determining a intermediate-to-endpoint latency measure based on said time stamps; and
   storing said intermediate-to-endpoint latency measure on a computer readable storage medium.

11. The medium of claim 10 comprising a program, the program further comprising the step of retrieving said flow records from said at least one device.

12. The medium of claim 10 comprising a program, the program further comprising the step of verifying said first transmission comprises a TCP SYN flag and said second communication comprises a TCP SYN flag and a TCP ACK flag.

13. The medium of claim 10 comprising a program, the program further comprising the step of matching flow engine identifications associated with each of said at least two flows.

14. The medium of claim 10 comprising a program, the program further comprising the step of determining said latency measure based on said time stamps, said latency measure comprising an endpoint-to-endpoint latency measure.

15. The medium of claim 10 comprising a program, the program further comprising the step of determining said latency measure based on said time stamps, said latency measure comprising an intermediate-to-intermediate latency measure.

16. The medium of claim 10 comprising a program, the program further comprising the step of determining client server roles based on the time stamps associated with each of said at least two flows.

17. The non-transitory computer readable medium of claim 10, wherein the flow records provide traffic information and comprise aggregated packets based on a type of service, the IP protocol, the source IP addresses, the destination IP addresses, the source ports and the destination ports.

18. A system for passively computing network latency, comprising:
   a first endpoint communications device configured to send a first transmission comprising a connection set-up indicator;
   a second communications device configured to send a second transmission in response to said first transmission, said second transmission comprising a connection set-up acknowledgment indicator;
   at least one first device having flow records, said flow records comprising at least two flows associated with said first transmission and said second transmission; wherein the flow records comprise at least a start time stamp and an end time stamp of the flow associated with said first transmission and at least a start time stamp and an end time stamp of the flow associated with said second transmission;
   a second device configured as a harvester comprising at least one microprocessor and further configured to match said two flows, said harvester matching said two flows based on:
      source IP addresses and destination IP addresses associated with each of said at least two flows;
      matching said at least two flows based on the IP protocol associated with each of said at least two flows;
      source ports and destination ports associated with each of said at least two flows;
      verifying that the start time stamp of the flow associated with said first transmission occurs prior to the start time stamp of the flow associated with said second transmission;
      verifying that the end time stamp of the flow associated with said first transmission occurs after the start time stamp of the flow associated with said second transmission; and
      said harvester further configured to determine an intermediate-to-endpoint latency measure based on said time stamps associated with each of said at least two flows.

19. The system of claim 18 wherein said harvester is further configured to retrieve said flow records from said at least one first device.

20. The system of claim 18 wherein said at least one first device is further configured to export said flow records to said harvester.

21. The system of claim 18 wherein said flow records is selected from the group consisting essentially of NetFlow, JFlow, Sflow, or IPFIX flow export packets.

22. The system of claim 18, wherein said latency measure further comprises an endpoint-to-endpoint latency measure.

23. They system of claim 18, wherein said latency measure further comprises an intermediate-to-intermediate latency measure.

24. The system of claim 18, wherein said harvester is further configured to determine client server roles based on the time stamps associated with each of said at least two flows.

25. The system of claim 18, wherein the flow records provide traffic information and comprise aggregated packets based on a type of service, the IP protocol, the source IP addresses, the destination IP addresses, the source ports and the destination ports.

* * * * *